(12) United States Patent  
Wang He et al.

(10) Patent No.: US 9,097,395 B2
(45) Date of Patent: Aug. 4, 2015

(54) LENS WITH DIVERGENT STRUCTURE AND BACKLIGHT MODULE INCORPORATING THE SAME

(71) Applicant: HON HAI PRECISION INDUSTRY CO., LTD., New Taipei (TW)

(72) Inventors: Li-Ying Wang He, New Taipei (TW); Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/092,945

(22) Filed: Nov. 28, 2013

(65) Prior Publication Data

US 2015/0117028 A1    Apr. 30, 2015

(30) Foreign Application Priority Data

Oct. 25, 2013  (TW) .............................. 102138622 A

(51) Int. Cl.
  *F21K 99/00*     (2010.01)
  *F21V 5/04*      (2006.01)
  *F21V 5/00*      (2015.01)

(52) U.S. Cl.
  CPC . *F21K 9/50* (2013.01); *F21V 5/004* (2013.01); *F21V 5/048* (2013.01)

(58) Field of Classification Search
  CPC .......... F21K 9/50; F21Y 2101/02; F21V 5/04; F21V 5/046; F21V 5/048; F21V 5/08; F21V 5/00; F21V 5/002; F21V 5/004; F21V 5/005
  See application file for complete search history.

(56) References Cited

U.S. PATENT DOCUMENTS

| | | | |
|---|---|---|---|
| 2012/0075870 A1* | 3/2012 | Kayanuma et al. | 362/311.06 |
| 2014/0169031 A1* | 6/2014 | Lin | 362/606 |
| 2014/0177234 A1* | 6/2014 | Wang He | 362/311.02 |

* cited by examiner

*Primary Examiner* — Bao Q Truong
(74) *Attorney, Agent, or Firm* — Novak Druce Connolly Bove + Quigg LLP

(57) ABSTRACT

A lens includes a main lens and a divergent structure positioned on the top of the main lens. The main lens has a light incident surface for receiving light generated by an LED light source and a light exit surface opposite to the light incident surface. The divergent structure includes a plurality of annular micro lenses each having a triangular shape in cross section. The micro lenses are arranged in a series of concentric circles with regard to a center point located on an optical axis of the main lens. Each micro lens includes an inner surface and an outer surface connected with the inner surface. The inner and outer surfaces define an angle therebetween, which is increased gradually from the center point toward a periphery of the light exit surface. A backlight module using the lens is also provided.

20 Claims, 7 Drawing Sheets

LENS WITH DIVERGENT STRUCTURE AND BACKLIGHT MODULE INCORPORATING THE SAME

TECHNICAL FIELD

The present disclosure relates generally to a lens with divergent structure formed at the top thereof and a backlight module incorporating the lens.

DESCRIPTION OF RELATED ART

Light emitting diode (LED) is a solid state light emitting device formed of semiconductors, which is more stable and reliable than other conventional light source such as incandescent bulbs. Thus, it is being widely used in various fields such as numeral/character displaying elements, signal lights, and lighting and display devices.

Nowadays, LED light sources are widely applied for illumination, such as being used in direct-type backlight module assembly. The direct-type backlight module assembly includes an LED light source and a lens optically coupled to the LED light source. Light generated by the LED light source is spread by the lens into a wide angular range. However, a light intensity distribution of the backlight module assembly is mostly concentrated at a center while becomes rapidly weaker towards a periphery thereof. That is, a light intensity distribution of such a backlight module using the lens is non-uniform.

What is needed, therefore, is a lens and a backlight module incorporating the lens which can overcome the above mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
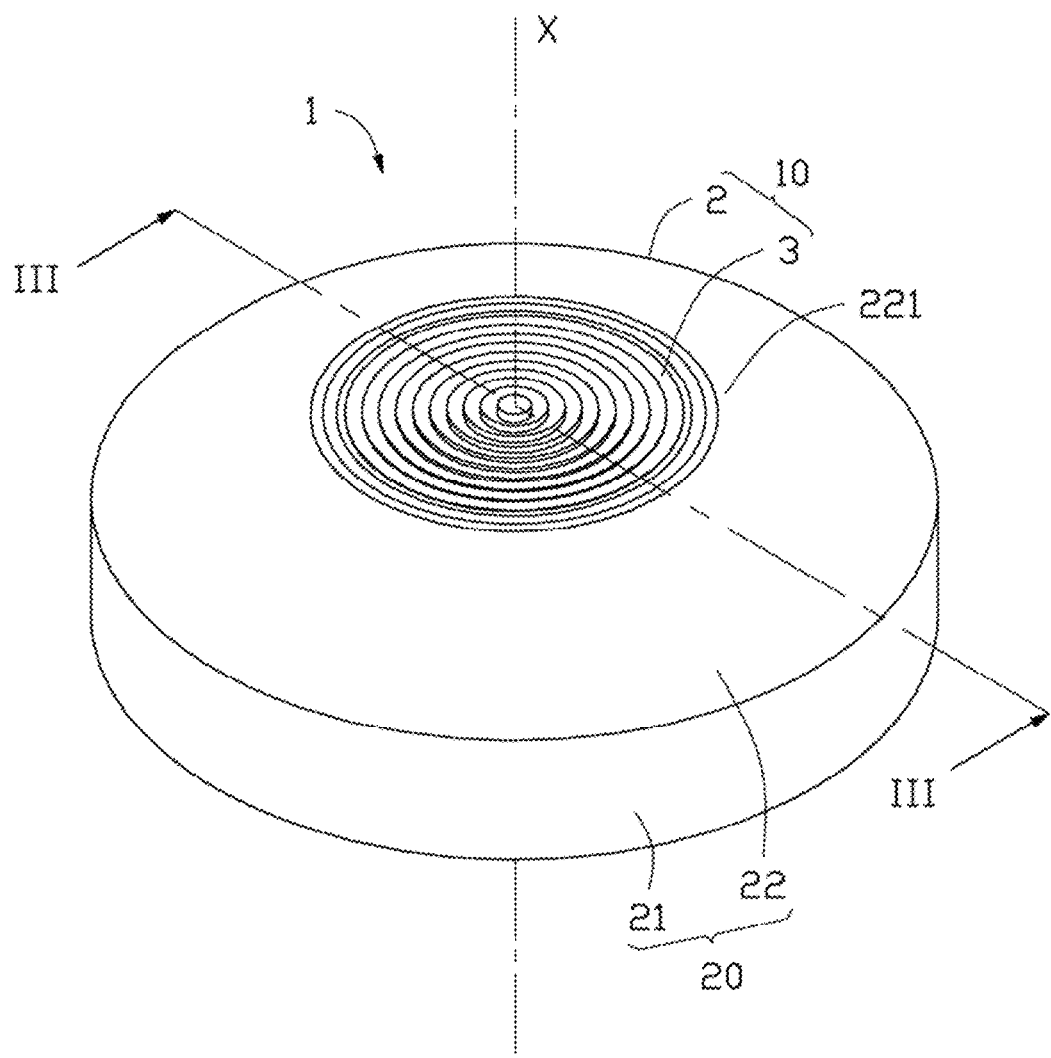
FIG. 1 is an isometric, perspective view of a backlight module in accordance with a first embodiment of the present disclosure.
Figure 2:
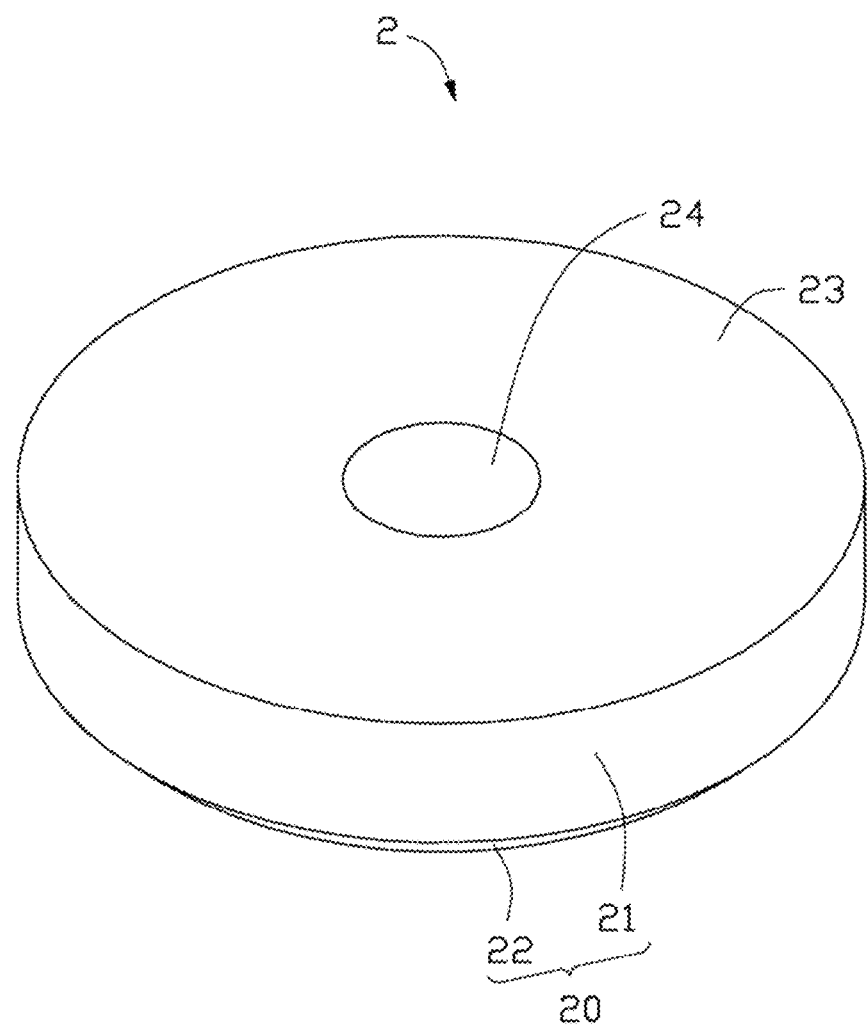
FIG. 2 is an inverted view of a lens of the backlight module of FIG. 1.
Figure 3:
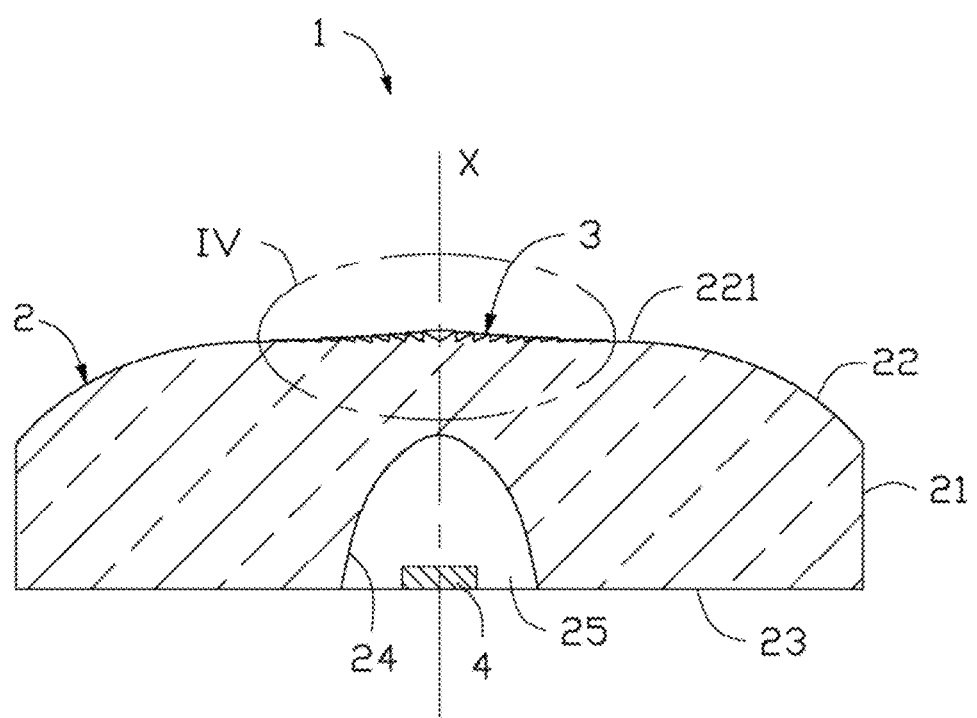
FIG. 3 is a cross-sectional view of the backlight module of FIG. 1, taken along line III-III thereof.

Referring to FIGS. 1, 2 and 3, a backlight module 1 in accordance with a first embodiment of the present disclosure is illustrated. The backlight module 1 includes a light emitting diode (LED) light source 4 and a lens 10 optically coupled to the LED light source 4. The lens 10 includes a main lens 2 and a divergent structure 3 formed on the top of the main lens 2. The main lens 2 includes a light incident surface 24 for receiving light from the LED light source 4, a light exit surface 20 spaced from the light incident surface 24, and an annular mounting surface 23 interconnecting the light incident surface 24 and the light exit surface 20.

Light generated by the LED light source 4 is refracted out the main lens 2 from the light exit surface 20, and a portion of the refracted light concentrated at a center of the main lens 2 is mostly diverged by the divergent structure 3 toward a periphery of the light exit surface 20 of the main lens 2.

The main lens 2 has an optical axis X extending through the light incident surface 24 and the light exit surface 20 thereof. The light incident surface 24 and the light exit surface 20 each are radially symmetrical with respect to the optical axis X of the main lens 2.

The light incident surface 24 is located at a center of the mounting surface 23 and recessed inwardly toward the light exit surface 20 from an inner periphery of the annular mounting surface 23. In the present embodiment, the light incident surface 24 is a part of an ellipsoid, with a major axis thereof coinciding with the optical axis X of the main lens 2. Alternatively, the light incident surface 24 is a part of a sphere or a paraboloid.

The light exit surface 20 includes a first cylindrical portion 21 extending upwardly from an outer periphery of the annular mounting surface 23 and a second convex portion 22 bending inwardly and upwardly from a top periphery of the first cylindrical portion 21. A distance between the convex portion 22 of the light exit surface 20 and a bottom of the lens 10 firstly increases and then decreases along a radial direction perpendicular to the optical axis X of the main lens 2 from a center to a periphery of the light exit surface 20 of the main lens 2.

The light incident surface 24 and the mounting surface 23 cooperatively define a receiving space 25. The LED light source 4 is received in the receiving space 25 and faces the light incident surface 24 of the main lens 2. The LED light source 4 is located at the optical axis X of the main lens 2. Light refracted into the main lens 2 from the light incident surface 24 is mostly refracted out the main lens 2 from the second convex portion 22 of the light exit surface 20, with a part of the light being refracted out the main lens 2 from the first cylindrical portion 21 of the light exit surface 20.

Figure 4:
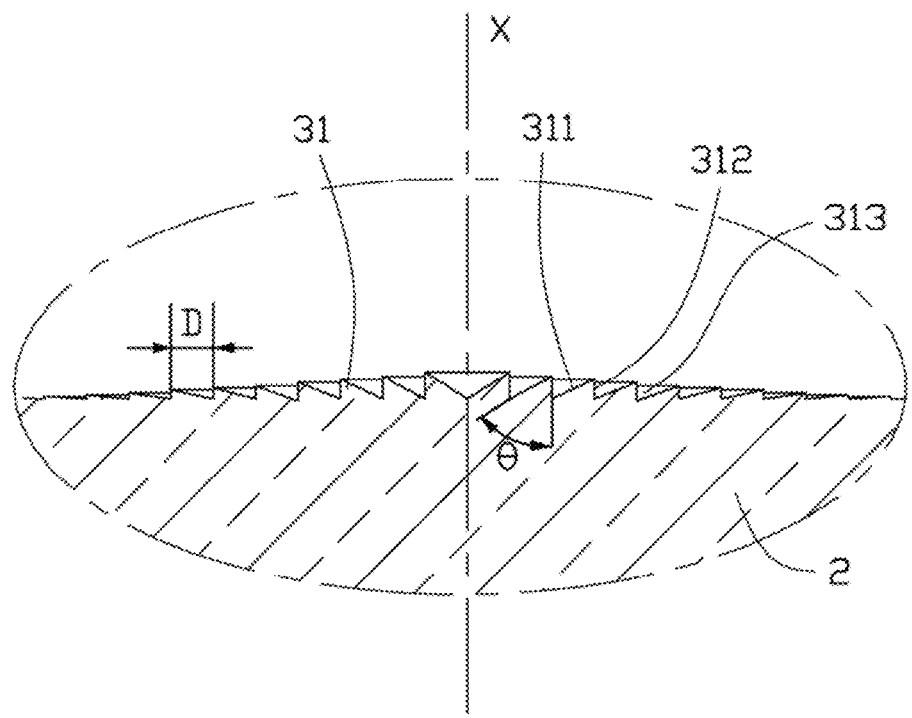
FIG. 4 is an enlarged view of part IV of FIG. 3.

Referring to FIGS. 1, 3 and 4 together, the divergent structure 3 includes a plurality of annular micro lenses 31 formed on the second convex portion 22 of the light exit surface 20 of the main lens 2. The micro lenses 31 are arranged in a series of concentric circles with regard to a center point located at the optical axis X of the main lens 2. In the present embodiment, a central region 221 of the second convex portion 22 of the light exit surface 20 is a horizontal surface, and the divergent structure 3 is positioned on the central region 221 of the second convex portion 22 and located over the light incident surface 24.

Each micro lens 31 includes an inner surface 311 and an outer surface 312 connected with the inner surface 311. The inner and outer surfaces 311, 312 of each micro lens 31 cooperatively define an angle θ therebetween. The angles θ of the micro lenses 31 are gradually increased along the radial direction perpendicular to the optical axis X from the center toward the outer periphery of the light exit surface 20 of the main lens 2.

The micro lenses 31 are located around the optical axis X. The outer surface 312 of each micro lens 31 is parallel to the optical axis X of the main lens 2. The inner surface 311 of each micro lens 31 is inclined to the optical axis X of the main lens 2. In detail, the inner surface 311 of each micro lens 31 forms a periphery of an inverted frustum-cone, and the outer surface 312 of each micro lens 31 forms a periphery of a cylinder. Each micro lens 31 is generally triangular in cross section. An inner diameter of each micro lens 31 is gradually increased along the optical axis X from the light incident surface 34 toward the second convex portion 22 of the light exit surface 20 of the main lens 2.

The micro lenses 31 are connected with each other side by side. That is, the outer surface 312 of a micro lens 31 is directly connected with the neighboring inner surface 311 of an adjacent micro lens 31. Every two adjacent micro lenses 31 define an annular groove 313 therebetween, and a width of the groove 313 is gradually increased along the optical axis X of the main lens 2 from the light incident surface 24 toward the second convex portion 22 of the light exit surface 20. A distance D defined between the outer surfaces 312 of two adjacent micro lenses 31 is equal to each other. The heights of the micro lenses 31 (i.e., the heights of the outer surfaces 312 of the micro lenses 31) gradually decrease along the radial direction perpendicular to the optical axis X of the main lens 2 from the center toward the periphery of the light exit surface 20 of the main lens 2. In detail, the distance D defined between the outer surfaces 312 of two adjacent micro lenses 31 is 0.3 millimeters. The height of the outer surface 312 of the outermost micro lens 31 is 0.02 millimeters, while the height of the outer surface 312 of the innermost micro lens 31 is 0.19 millimeters.

Figure 5:
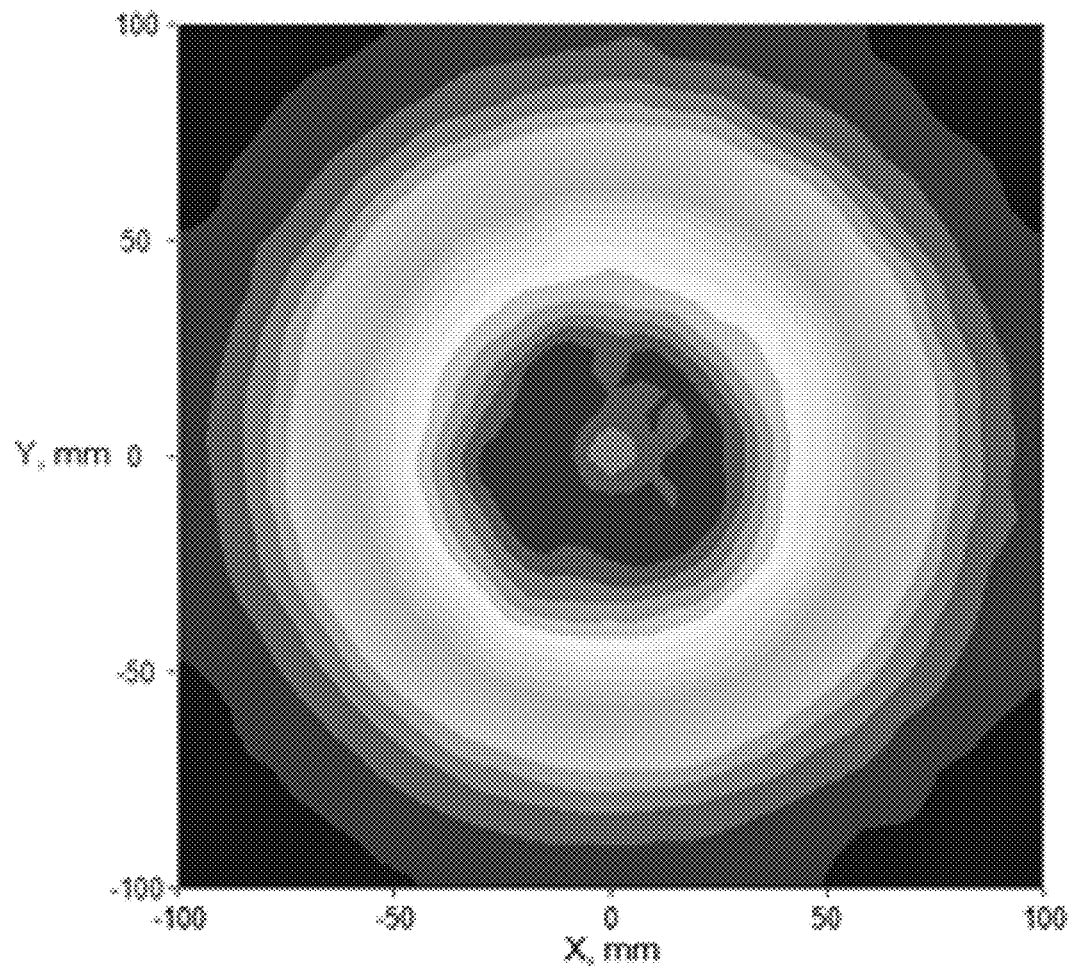
FIG. 5 is a light intensity distribution of a backlight module using a lens similar to that shown in FIG. 1, but without a divergent structure formed on the top of a main lens of the lens of the backlight module.

Referring to FIG. 5, a light intensity distribution pattern of a backlight module using a lens similar to that shown in FIG. 1 is illustrated. Different from the lens shown in FIG. 1, the lens of the backlight module having the light intensity distribution pattern in FIG. 5 only includes the main lens 2 of FIG. 1 but without the divergent structure 3 formed on the top of the main lens 2 of the lens 10 of FIG. 1. In detail, light generated from the LED light source is refracted into the lens through a light incident surface thereof, and a part of the refracted light concentrated at the optical axis of the main lens is directly refracted out the main lens from the light exit surface and enters into air without being diverged by the divergent structure. That is, a light distribution of the backlight module is mostly concentrated at the center while becomes rapidly weaker towards a periphery of the lens as shown in FIG. 4. Thus, the backlight module having the light intensity distribution pattern in FIG. 5 creates a non-uniform light distribution.

Figure 6:
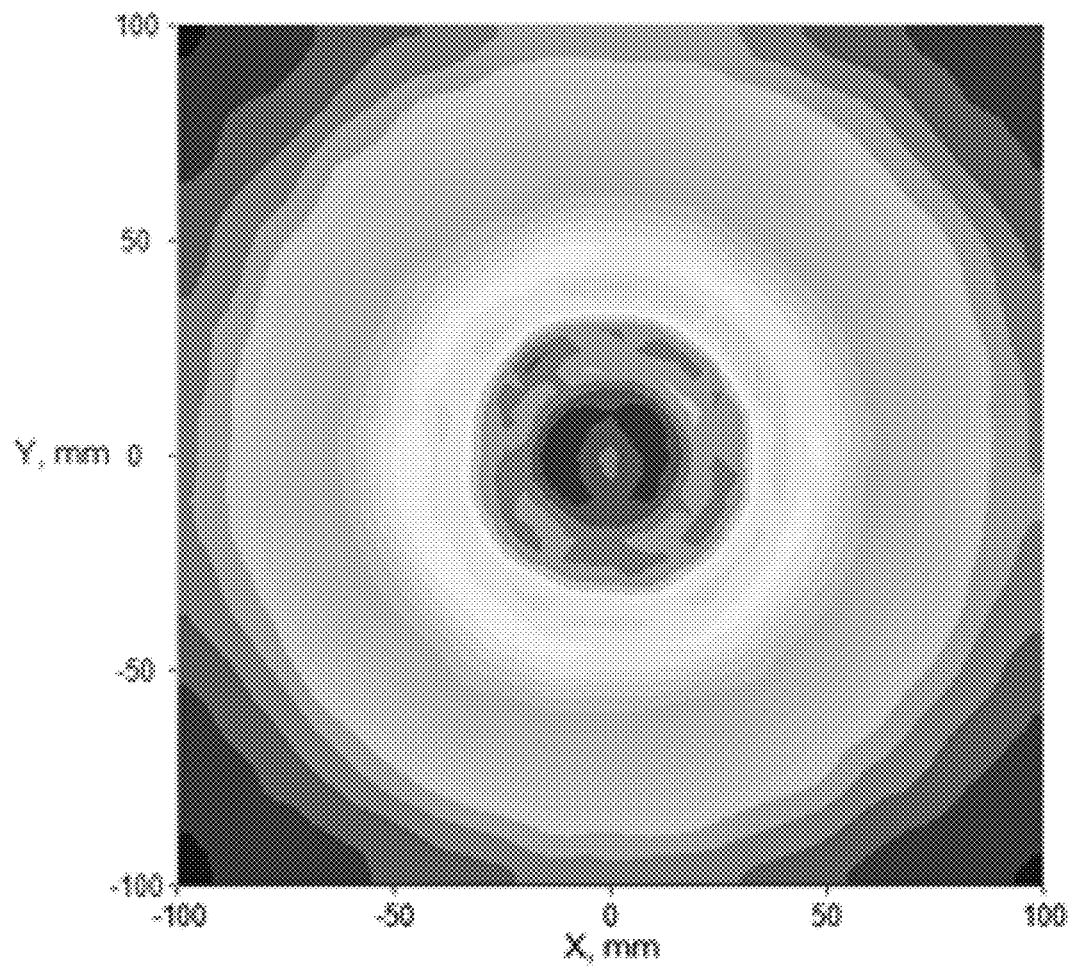
FIG. 6 is a light intensity distribution of the backlight module of FIG. 1.

Referring to FIG. 6, a light intensity distribution of the backlight module 1 in accordance with the first embodiment of the present disclosure is illustrated. Different from the lens of the backlight module in FIG. 5, the lens 10 of the backlight module 1 in FIG. 1 includes the main lens 2 and the divergent structure 3 formed on the top of the main lens 2. That is, the refracted light concentrated at the optical axis X of the main lens 2 is effectively diverged by the micro lenses 31 of the divergent structure 3 toward the periphery of the light exit surface 20 of the main lens 2. Accordingly, the backlight module 1 using the lens 10 obtains a uniform light distribution as shown in FIG. 6.

Figure 7:
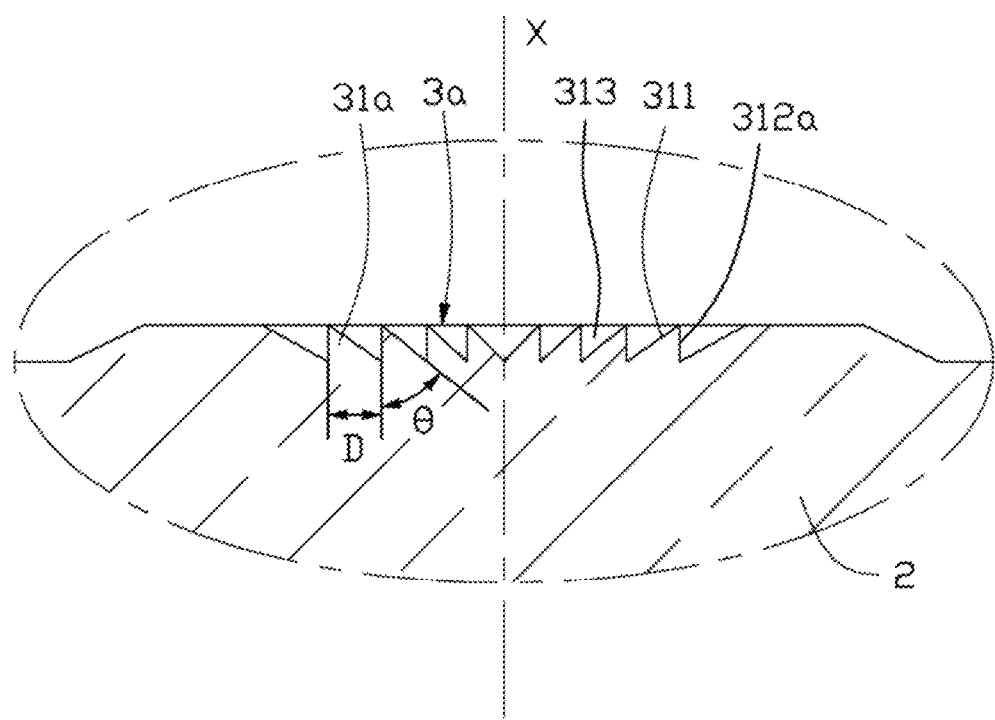
FIG. 7 is similar to FIG. 4, but shows a lens of a backlight module in accordance with a second embodiment of the present disclosure.

Referring to FIG. 7, a lens of a backlight module in accordance with a second embodiment of the present disclosure is illustrated. Different from the divergent structure 3 of the backlight module 1 shown in FIG. 4, in the divergent structure 3a, the heights of the micro lenses 31a of the divergent structure 3a are equal to each other, and a distance D defined between the outer surfaces 312a of every two adjacent micro lenses 31a is gradually increased along the radial direction perpendicular to the optical axis X of the main lens 2 from the center toward the periphery of the light exit surface 20 of the main lens 2.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A lens for a light emitting diode (LED) backlight module comprising:
   a main lens, comprising a light incident surface configured for receiving light emitted from an LED light source and a light exit surface opposite to the light incident surface; and
   a divergent structure formed on the top of the main lens and being configured for diverging light emerging from the light exit surface of the main lens, and the divergent structure comprising a plurality of annular micro lenses formed on the light exit surface of the main lens;
   wherein the micro lenses are arranged in a series of concentric circles with regard to a center point located on an optical axis of the main lens, and each micro lens comprises an inner surface and an outer surface connected with the inner surface; and
   wherein the inner and outer surfaces of each micro lens cooperatively define an angle therebetween, and the angles of the micro lenses increase gradually along a radial direction perpendicular to the optical axis from a center toward an outer periphery of the light exit surface of the main lens.

2. The lens of claim 1, wherein the micro lenses are located around the optical axis of the main lens, the outer surface of each micro lens is parallel to the optical axis, and the inner surface of each micro lens is inclined to the optical axis.

3. The lens of claim 2, wherein each micro lens is generally triangular in cross section.

4. The lens of claim 2, wherein the inner surface of each micro lens forms a periphery of an inverted frustum-cone, and the outer surface of each micro lens forms a periphery of a cylinder.

5. The lens of claim 4, wherein an inner diameter of each micro lens increases gradually along the optical axis from the light incident surface toward the light exit surface of the main lens.

6. The lens of claim 4, wherein the micro lenses are connected with each other side by side.

7. The lens of claim 6, wherein a distance defined between the outer surfaces of every two adjacent micro lenses is equal to each other, and the heights of the micro lenses gradually decrease along the radial direction perpendicular to the optical axis from the center toward the outer periphery of the light exit surface of the main lens.

8. The lens of claim 6, wherein the heights of the micro lenses are equal to each other, and a distance defined between the outer surfaces of every two adjacent micro lenses gradually increases along the radial direction perpendicular to the optical axis of the main lens from the center toward the outer periphery of the light exit surface of the main lens.

9. The lens of claim 2, wherein the main lens further comprises an annular mounting surface interconnecting the light incident surface and the light exit surface, and the light incident surface is located at a center of the annular mounting surface and recessed inwardly from an inner periphery of the annular mounting surface toward the light exit surface.

10. The lens of claim 9, wherein the light exit surface comprises a first cylindrical portion extending upwardly from an outer periphery of the annular mounting surface and a second convex portion bending inwardly and upwardly from a top periphery of the first cylindrical portion, the divergent structure being positioned on a central region of the second convex portion of the light exit surface.

11. A light source module comprising:
a light emitting diode (LED) source; and
a lens optically coupled to the LED light source, comprising a main lens and a divergent structure positioned on the top of the main lens, the main lens comprising a light incident surface for receiving light from the LED light source and a light exit surface opposite to the light incident surface, the divergent structure comprising a plurality of annular micro lenses formed on the light exit surface of the main lens, the light generated by the LED light source leaving the main lens from the light exit surface;
wherein the micro lenses are arranged in a series of concentric circles with regard to a center point located on an optical axis of the main lens, and each micro lens comprises an inner surface and an outer surface connected with the inner surface; and
wherein the inner and outer surfaces of each micro lens cooperatively define an angle therebetween, and the angles of the micro lenses increase gradually along a radial direction perpendicular to the optical axis from a center toward an outer periphery of the light exit surface of the main lens.

12. The light source module of claim 11, wherein the micro lenses are located around the optical axis of the main lens, the outer surface of each micro lens is parallel to the optical axis, and the inner surface of each micro lens is inclined to the optical axis.

13. The light source module of claim 12, wherein each micro lens is generally triangular in cross section.

14. The light source module of claim 12, wherein the inner surface of each micro lens forms a periphery of an inverted frustum-cone, and the outer surface of each micro lens forms a periphery of a cylinder.

15. The light source module of claim 14, wherein an inner diameter of each micro lens is increased gradually along the optical axis from the light incident surface toward the light exit surface of the main lens.

16. The light source module of claim 14, wherein the micro lenses are connected with each other side by side, and every two adjacent micro lenses define an annular groove therebetween.

17. The light source module of claim 16, wherein a distance defined between the outer surfaces of every two adjacent micro lenses is equal to each other, and the heights of the micro lenses are gradually decreased along the radial direction perpendicular to the optical axis from the center toward the outer periphery of the light exit surface of the main lens.

18. The light source module of claim 16, wherein the heights of the micro lenses are equal to each other, and a distance defined between the outer surfaces of every two adjacent micro lenses is gradually increased along the radial direction perpendicular to the optical axis from the center toward the outer periphery of the light exit surface of the main lens.

19. The light source module of claim 12, wherein the main lens further comprises an annular mounting surface interconnecting the light incident surface and the light exit surface, and the light incident surface is located at a center of the annular mounting surface and recessed inwardly from an inner periphery of the annular mounting surface toward the light exit surface.

20. The light source module of claim 19, wherein the light exit surface of the main lens comprises a first cylindrical portion extending upwardly from an outer periphery of the annular mounting surface and a second convex portion bending inwardly and upwardly from a top periphery of the first cylindrical portion, the divergent structure being positioned on a central region of the second convex portion of the light exit surface.

* * * * *